UNITED STATES PATENT OFFICE.

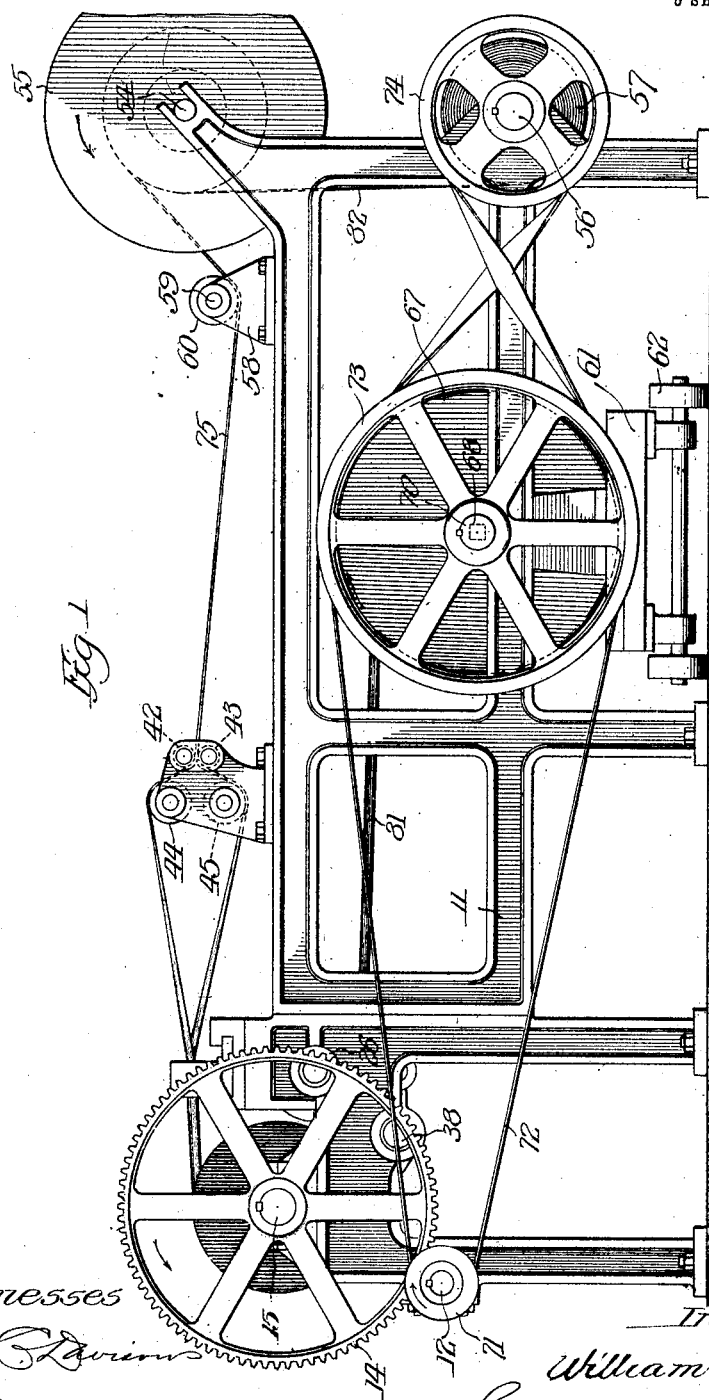

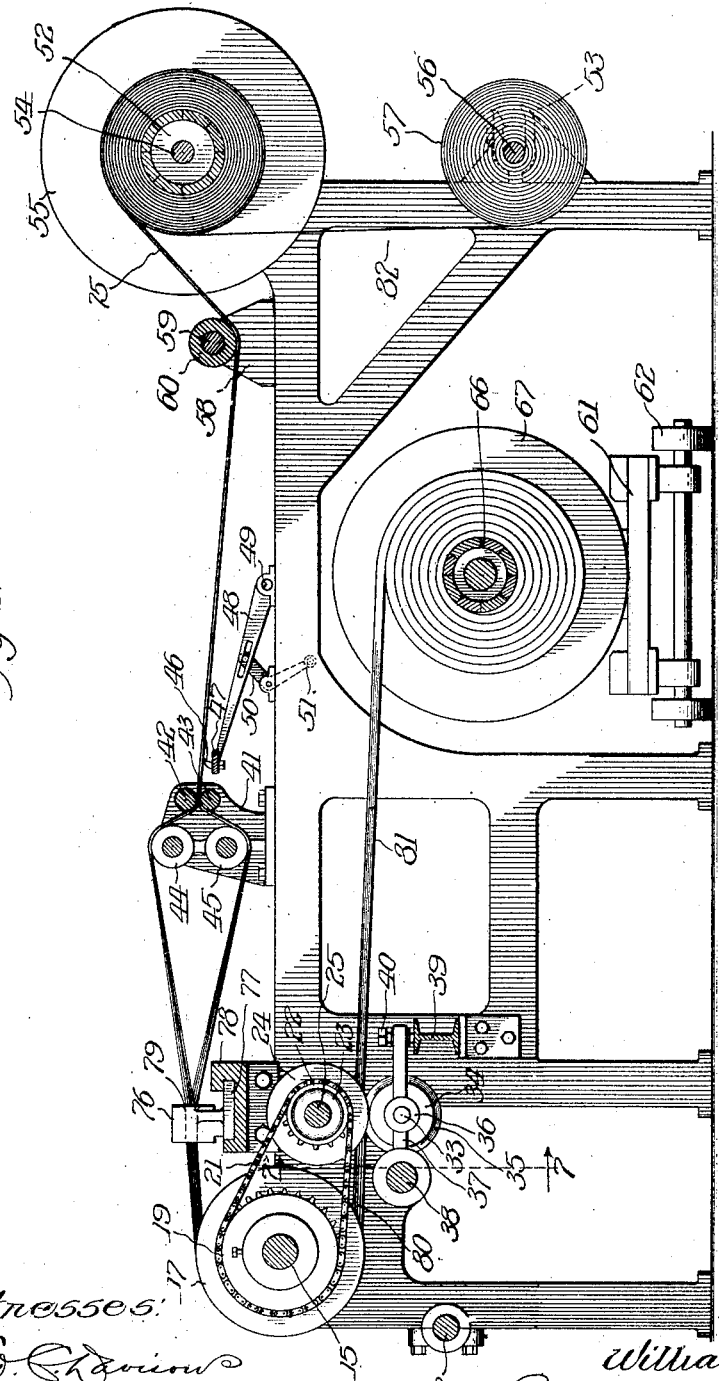

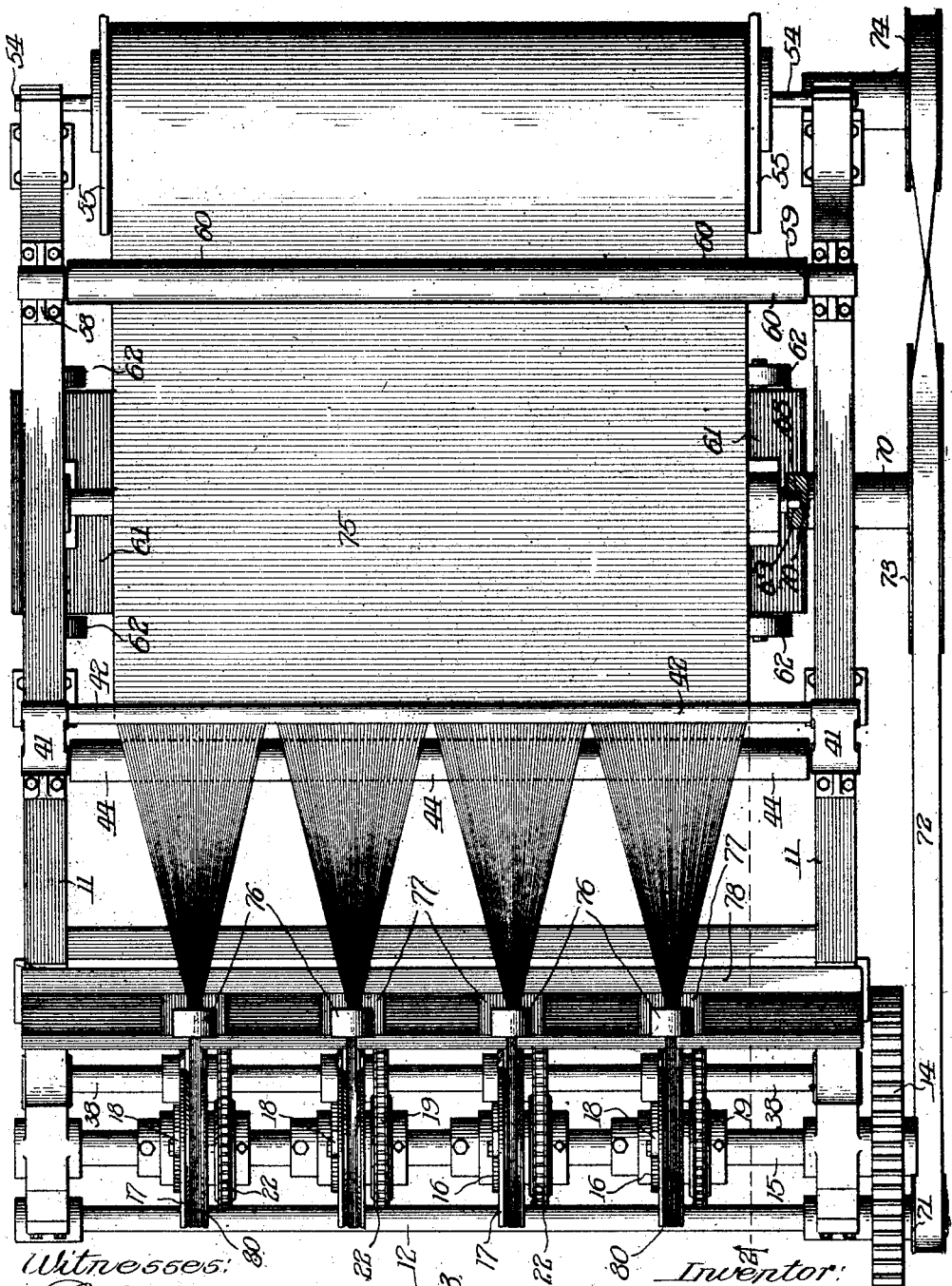

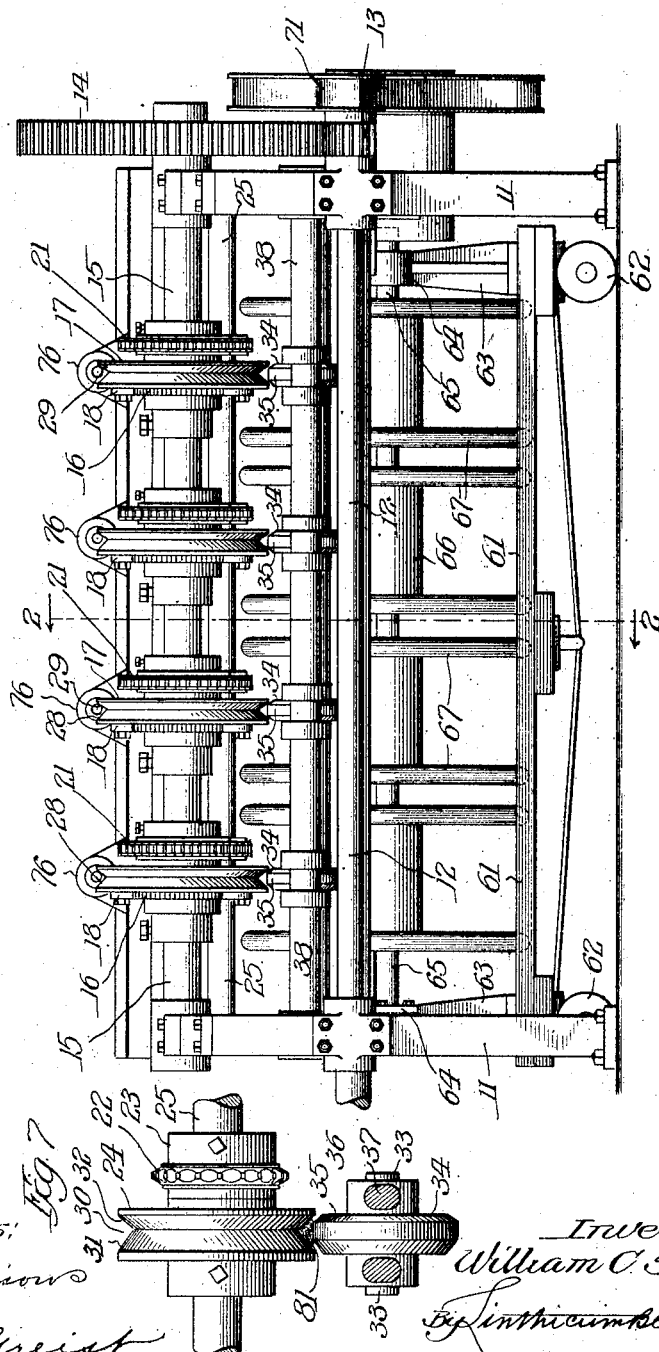

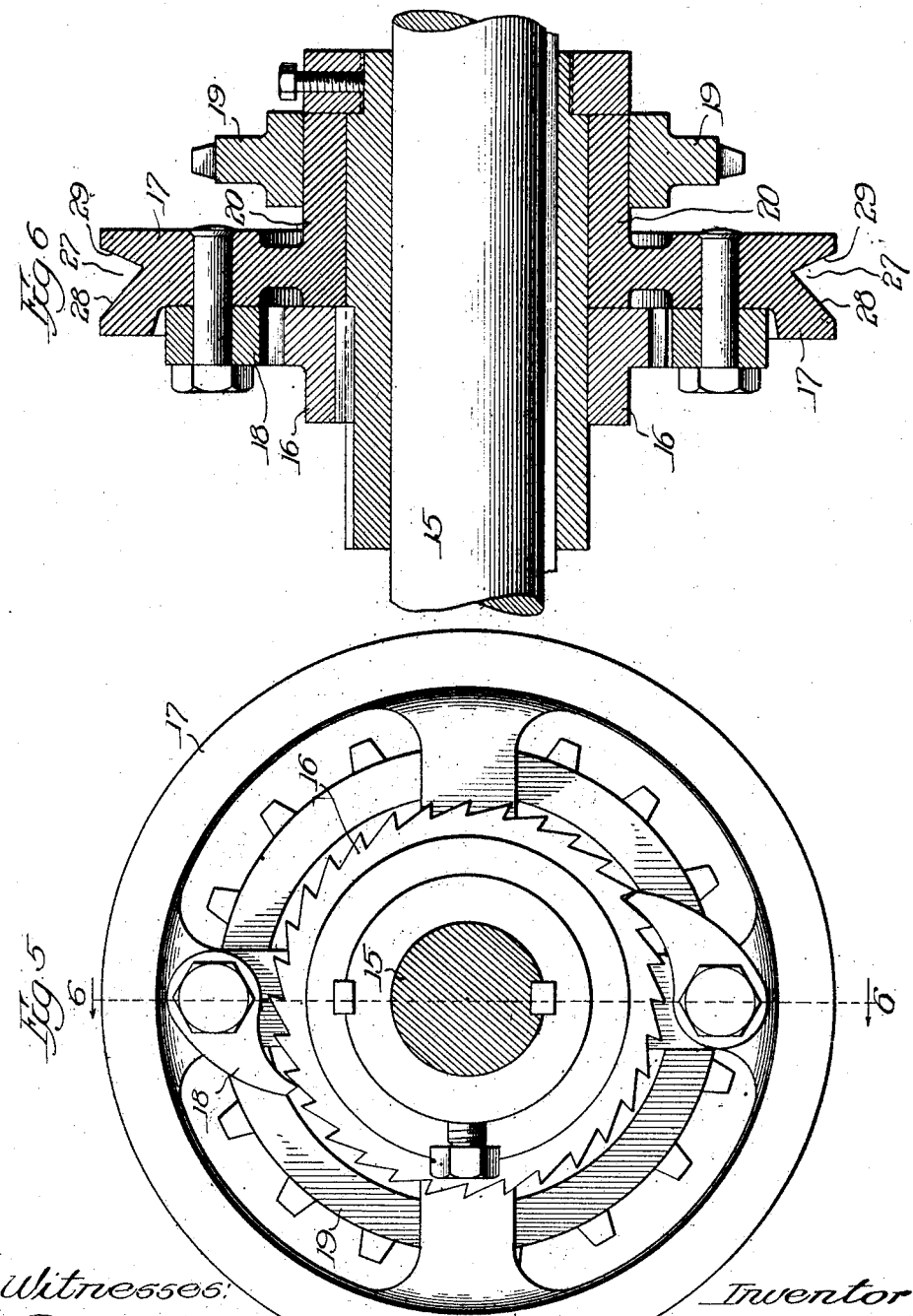

WILLIAM C. STEVENS, OF AKRON, OHIO, ASSIGNOR TO THE FIRESTONE TIRE & RUBBER COMPANY, OF AKRON, OHIO, A CORPORATION OF OHIO.

TIRE-BEAD-MAKING MACHINE.

1,100,451.  Specification of Letters Patent.  Patented June 16, 1914.

Application filed December 21, 1912. Serial No. 737,934.

*To all whom it may concern:*

Be it known that I, WILLIAM C. STEVENS, a citizen of the United States, residing at Akron, in the county of Summit and State of Ohio, have invented certain new and useful Improvements in Tire-Bead-Making Machines, of which the following is a specification.

My invention relates to machines employed in the manufacture of pneumatic tires and particularly to a machine adapted to the forming of the rubber beads built into the marginal portions of such tires to provide the lateral offsets or lips which take under the flanges of the wheel rim to hold the tire in place upon the wheel. These beads are usually of a substantially triangular cross-section and are composed of rubber containing a plurality of fibrous strands extending longitudinally thereof. In the formation of such beads I employ a plurality of strips torn from a fabric which is heavily impregnated with rubber of such a nature as to be sticky, these strips being bunched into a fillet and passed through forming rolls under tension and pressure, the resultant bead lengths being then wound upon reels or drums and cured.

In order that the invention and the manner of its application may be readily understood by those skilled in the art, I have in the accompanying illustrative drawings and in the detailed following description based thereon set forth a preferred embodiment of the invention.

In these drawings, Figure 1 is a side elevation of a machine constructed according to my invention; Fig. 2 is a longitudinal vertical section on the line 2—2 of Fig. 4; Fig. 3 is a top plan view; Fig. 4 is an end elevation; Fig. 5 is a detail side elevation of one of the forming wheels; Fig. 6 is a section on the line 6—6 of Fig. 5; and Fig. 7 is a fragmentary section on the line 7—7 of Fig. 2 showing certain of the forming rolls in edge elevation.

Having reference to the drawings, the numeral 11 designates the machine frame in which is journaled the drive shaft 12 driven from any suitable source of power and provided with the drive pinion 13 which is in mesh with the gear wheel 14 mounted on the shaft 15 likewise journaled in the frame. Upon the shaft 15 are splined a plurality of ratchet wheels designated by the numeral 16. Each of the ratchet wheels is associated with a fillet-forming wheel 17 to which it is operatively coupled by pawls 18 providing for relative movement of the ratchet and forming wheels in one direction only. A sprocket 19 is fixedly mounted upon the hub 20 of each forming wheel, each of the sprockets 19 being connected by the sprocket chain 21 with the sprocket 22 carried by the hub 23 of a bead forming wheel 24 mounted upon the shaft 25 which is likewise journaled in the frame at 26. The fillet-forming wheel 17 has a peripheral groove 27 of substantially V-shape in cross section, the faces 29 and 29 thereof being knurled to present a roughened surface, and the bead forming wheel 24 is provided with a similar groove 30, the operative faces 31 and 32 of which are smooth. Immediately below the bead forming wheels 24 are mounted upon the floating shaft 33 a plurality of pressure rolls 34, each of which has a convex periphery 35, shown as having a cross section in the form of a truncated wedge, the convex periphery of each pressure wheel 34 working in the groove 30 of the corresponding bead forming wheel 24. The bead forming wheels 24 and the pressure wheels 34 are likewise splined or otherwise suitably secured upon their shafts 25 and 33 to provide for longitudinally shifting the same in unison with the shifting of the fillet-forming wheels 17. Adjustment of the pressure wheels 34 toward and from the bead forming wheels 24 is provided for by mounting the shaft 33 within collars 36 of the levers 37, one end of each lever being pivotally fulcrumed upon the shaft 38 which is suitably journaled in the frame while the opposite end of the lever is adjustably supported upon the cross beam 39 by means of the set screw 40.

Upon the top of the frame in one arm of the journal bracket 41 is mounted a pair of confining guide rolls 42 and 43 and in another arm of the same journal bracket is mounted a pair of separating rolls 44 and 45. Likewise mounted upon the top of the frame is mounted a set of slitting knives 46 shown for example as carried by a bar 47 extending transversely of the machine upon one end of lever arms 48 fulcrumed at 49 and adapted to be raised and lowered by means of an angle lever 50 pivoted to the frame and provided with an operating handle 51.

At that end of the machine opposite the forming wheels the frame is provided with slotted journal bearings 52 and 53 adapted respectively to receive the shaft 54 of a fabric spool 55 and a shaft 56 of a liner reel 57. Within the journal bracket 58 in front of the slotted journal bearing 52 is journaled a shaft 59 carrying a guide roll 60 extending transversely of the machine frame.

One side of the frame 11 is, as will be seen from Fig. 1, closed off in its medial portion by a longitudinal frame member, while from the opposite side of the frame, as will be seen from Fig. 2, the corresponding member is omitted, the frame being formed somewhat as an arch so as to permit a car 61 mounted upon wheels 62 to be run beneath the machine. This car carries pillow blocks 63 provided with journal bearings 64 within which are mounted the two ends of the shaft 65 carrying reels 66 which are splined thereon or otherwise suitably mounted to provide for longitudinal shifting as in the case of the forming wheels, each of the reels including side plates 67. One end of the shaft 65 projects beyond its journal bearing 64 and is squared, as shown at 68, for releasable engagement with a squared opening 69 of the stub shaft 70 journaled in the machine frame. Power is transmitted from the drive shaft 12 to the stub shaft 70 for the driving of the reel shaft 65, and to the shaft 56 for the driving of the liner reel 57 by means of a drive sheave 71 mounted on the end of the drive shaft, a friction belt 72 passing from said sheave 71 around the sheave 73 of the stub shaft 70 and thence across and extending around the sheave 74 on the liner wheel shaft 56, the tension of the belt being such as to permit slippage.

The machine is used in the following manner: Into the slotted journal bearing 52 is slipped the shaft 54 of the reel 55 upon which is wound a supply of fabric 75. This fabric is heavily impregnated with a sticky rubber, the warp of the fabric being composed of longitudinal threads comparatively close together and of considerable strength, while the weft is composed of comparatively few threads of relatively small strength. Usually the sheet of fabric is 44 inches wide, this width being sufficient to make four beads simultaneously, 11 inches of fabric making a bead of standard size. The fabric passes from the reel 55 beneath the guide roll 60 and thence between the confining guide rolls 42 and 43. The slitting knives 46, which are preferably 175 in number, being arranged in their elevated position engage the fabric and slit the same for a distance of 1½ or 2 feet into strips one-quarter of an inch wide. These strips passing in alternation one above the separating roller 44 and the next below the separating roller 45 from whence they pass into bunching dies 76, four in number, having their bases 77 independently slidable within the guide 78 whereby they may be adjusted to occupy a position in the plane of the respective fillet-forming wheels 17, the mouth of each flaring as indicated at 79 to facilitate the entrance of the strips.

If the bead is to be formed of a size requiring 11 inches of the fabric, the four sets of forming wheels and dies are equally spaced over the width of the sheet and the 44 component quarter inch strips of each 11 inches of fabric pass alternately under and over the separating rolls 44 and 45 into each of the bunching dies from whence they are conducted in parallel relation around the fillet-forming wheel 17 which is driven directly by the gear 14. The faces 28 and 29 of the groove 27 in the fillet forming wheel being rough the bundle of strips is engaged thereby and the tension exerted by the driven forming wheel upon the bundle of strips serves to crowd the latter down into the groove forming a compact fillet 80 of parallel strands or strips having a cross section corresponding to that of the groove. The end of the fillet is introduced between the bead forming wheel 24 and the pressure wheel 34 between which wheels it is compressed into the final form of the bead 81.

The peripheral speed of the bead forming wheel 24 is slightly greater than that of the fillet-forming wheel 17 so that in addition to the compacting of the fibers or strands of the fillet 80 between the two wheels 24 and 34, the fillet is also subjected to a longitudinal strain or tension supplementing that of the fillet-forming wheel 17 in taking all slack out of the warp threads and imparting to the bead 81 as it leaves the wheels 24 and 34 the highest degree of tensile resistance as well as compactness.

After the forward end of the fabric has been initially slit for a short distance, as stated, by the knives 46, these knives are lowered by the manipulation of the angle lever 50 through its handle 51 and thereafter the quarter inch strips are torn by reason of the fact that the alternate strips pass above and below the separating rolls 44 and 45 and are pulled continuously in a forward direction by their engagement within the groove of the fillet-forming wheel 17.

Assuming that the car 61 having mounted thereon a set of reels 66 has been placed in position beneath the machine frame, the forward end of the bead 81 is attached to such reel and is tightly wound thereon, the reel being frictionally driven through its sheave 73, the loose engagement of which with the belt 72 provides for the increase in diameter due to the addition of successive layers of bead thereon. When the reels of one set are filled the bead 81 is severed and the car 61 is run from beneath the machine, the squared end 68 of its shaft being slipped out of the squared socket 69 of the stub shaft and another car carrying a set of empty reels is run into place and the squared end of its shaft inserted into the squared socket of the stub shaft after which the operation proceeds as before.

Between each successive layer of fabric upon the reel 55 is arranged a liner sheet 82 and as the fabric is progressively unwound this liner sheet is wound upon the liner reel 57, which, being likewise frictionally driven from its sheaves 74, takes up the liner sheet as fast as it is unwound from the reel 55 notwithstanding the increase in diameter of the reel due to the layers accumulating thereon.

When the advance ends of the four bundles of strips are engaged within the grooves of the fillet forming wheels 17 it may happen that one bundle is less taut than the others and as the fillet-forming wheels are driven at a uniform speed it is desirable that all of the bundles shall be equally taut so that the tension shall be uniformly applied to the sheet of fabric 75. To accomplish this result the ratchet connection between each of the forming wheels 17 and their common shaft 15 is provided, the operator being able to grasp that wheel 17 of which the bundle of strips is slack and by turning the same to the extent of one or more ratchet teeth take up the slack and bring about a uniform tension upon the several bundles of strips.

While I have herein illustrated and described with a considerable degree of particularity constructional details of the machine embodying my invention, it is to be understood that the invention is not limited to the particular form and arrangement of the several parts which may be modified within a wide range without departing from the essence of the invention, the construction shown and the description based thereon being intended to be taken in an illustrative rather than a limiting sense.

I claim:

1. In a machine of the character described, the combination of means to tear a sheet of impregnated fabric into strips, means to assemble a plurality of the strips and form the same into a bead, substantially as described.

2. In a machine of the character described, the combination of means to separate a sheet of rubber impregnated fabric into strips, means to bundle a plurality of strips in parallel relation, and means to form the resultant fillet under pressure into a bead, substantially as described.

3. In a machine of the character described, the combination of means to tear a sheet of rubber impregnated fabric into strips, means to bundle a plurality of strips in parallel relation, and means to form the resultant fillet under tension and pressure into a bead, substantially as described.

4. In a machine of the character described, the combination of means to tear a sheet of rubber impregnated fabric into strips comprising a pair of confining guide rolls and a pair of separating guide rolls, the sheet of fabric being disposed between the confining rolls and the alternate strips arranged below and above the separating rolls, confining means to bundle the strips in parallel relation, and means to form the bundled strips under tension and pressure into a bead, substantially as described.

5. In a machine of the character described, the combination of means to tear a sheet of rubber impregnated fabric into strips comprising a pair of confining guide rolls and a pair of separating guide rolls, the sheet of fabric being disposed between the confining rolls and the alternate strips arranged below and above the separating rolls, confining means to bundle the strips in parallel relation, means to compact the bundle of strips into a fillet and to exert tension thereon to rend the fabric, and means to form the fillet under tension and pressure into a bead, substantially as described.

6. In a machine of the character described, the combination of means to tear a sheet of rubber impregnated fabric into strips comprising a pair of confining guide rolls and a pair of separating guide rolls, the sheet of fabric being disposed between the confining rolls and the alternate strips arranged below and above the separating rolls, confining means to bundle the strips in parallel relation, and means to apply tension to the strips and to form the same into a fillet comprising a grooved forming roll, and means to subject the resultant fillet to tension and pressure to form the same into a bead, substantially as described.

7. In a machine of the character described, the combination of means to tear a sheet of rubber impregnated fabric into strips comprising a pair of confining guide rolls and a pair of separating guide rolls, the sheet of fabric being disposed between the confining rolls and the alternate strips arranged below and above the separating rolls, confining means to bundle the strips in parallel relation, means to form the bundled strips under tension and pressure into a bead, and means for reeling up the finished bead under tension, substantially as described.

8. In a machine of the character described, the combination of means to tear a sheet of rubber impregnated fabric into strips comprising a pair of confining guide rolls and a pair of separating guide rolls, the sheet of fabric being disposed between the confining rolls and the alternate strips arranged below and above the separating rolls, confining means to bundle the strips in parallel relation, means to apply tension to the strips and to form the same into a fillet comprising a grooved forming roll, means to subject the resultant fillet to tension and pressure to form the same into a bead, and means for reeling up the bead under tension, substantially as described.

9. In a machine of the character described, the combination of means to separate a sheet of rubber impregnated fabric into strips, means to bundle a plurality of the strips in parallel relation, a wheel provided with a peripheral groove adapted to receive the bundle of strips and form the same into a fillet, a second wheel provided with a peripheral groove adapted to receive the fillet and form the same into a bead, a reel adapted to wind up the resultant bead, substantially as described.

10. In a machine of the character described, the combination of means to separate a sheet of rubber impregnated fabric into strips, means to bundle a plurality of the strips in parallel relation, a wheel provided with a peripheral groove adapted to receive the bundle of strips and form the same into a fillet, a second wheel provided with a peripheral groove adapted to receive the fillet and form the same into a bead, a reel adapted to wind up the resultant bead, and means to drive the fillet forming wheel, the bead forming wheel and the reel, each of the last two at a peripheral speed slightly greater than that of the one preceding, substantially as described.

11. In a machine of the character described, the combination of means to separate a sheet of rubber impregnated fabric into strips, means to bundle a plurality of the strips in parallel relation, a wheel provided with a peripheral groove adapted to receive the bundle of strips and form the same into a fillet, a second wheel provided with a peripheral groove adapted to receive the fillet and form the same into a bead, an adjustable pressure wheel arranged to compress the fillet into the groove of the bead forming wheel, and a reel adapted to wind up the bead under tension, substantially as described.

12. In a machine of the character described, the combination of means to separate a sheet of rubber impregnated fabric into strips, means to bundle a plurality of the strips in parallel relation, a wheel provided with a peripheral groove adapted to receive the bundle of strips and form the same into a fillet, a second wheel provided with a peripheral groove adapted to receive the fillet and form the same into a bead, an adjustable pressure wheel arranged to compress the fillet into the groove of the bead forming wheel, a reel adapted to wind up the bead under tension, and means to drive the fillet forming wheel, the bead forming wheel and the reel, the peripheral speed of the last two being slightly greater than that of the one preceding, substantially as described.

13. In a machine of the character described, the combination of means to support a roll of rubber impregnated fabric, means to slit the forward end of the fabric into strips, a pair of confining guide rolls receiving therebetween the slitted forward end of the fabric, a pair of separating rolls arranged between alternate strips of the fabric, a bunching die adapted to receive and bundle the strips in parallel relation, the preliminary slitting means adapted to be withdrawn, means to exert tension upon the bundle of strips to draw the fabric between the confining rolls and around the separating rolls to tear the same, and means to form under pressure the bundled strips into a bead, substantially as described.

14. In a machine of the character described, the combination of means to support a roll of rubber impregnated fabric, means to slit the forward end of the fabric into strips, a pair of confining guide rolls receiving therebetween the slitted forward end of the fabric, a pair of separating rolls arranged between alternate strips of the fabric, a bunching die adapted to receive and bundle the strips in parallel relation, the preliminary slitting means adapted to be withdrawn, a driven wheel having a peripheral groove with roughened walls adapted to receive the bundle of strips and to exert tension thereon to tear the fabric after the withdrawal of the slitting means, a wheel provided with a peripheral groove having smooth walls adapted to receive the fillet and form the same into a bead, the bead forming wheel being driven at a peripheral speed slightly greater than that of the fillet forming wheel, and a reel to wind up the resultant bead under tension, substantially as described.

15. In a machine of the character described, the combination of means to support a roll of rubber impregnated fabric, means to slit the forward end of the fabric into strips, a pair of confining guide rolls receiving therebetween the slitted forward end of the fabric, a pair of separating rolls arranged between alternate strips of the fabric, a bunching die adapted to receive and bundle the strips in parallel relation, the preliminary splitting means adapted to be withdrawn, a driven wheel having a peripheral groove with roughened walls adapted to receive the bundle of strips and to exert tension thereon to tear the fabric after the withdrawal of the slitting means, a wheel provided with a peripheral groove having smooth walls adapted to receive the fillet and form the same into a bead, the bead forming wheel being driven at a peripheral speed slightly greater than that of the fillet forming wheel, an adjustably mounted pressure roll provided with a peripheral rib arranged to bear upon the fillet within the groove of the bead forming wheel to subject the fillet to tension and pressure, and a frictionally driven reel to wind up the resultant bead under tension, substantially as described.

16. In a machine of the character described, the combination of a frame adapted to support a roll of fabric, means to tear the fabric into strips comprising a pair of confining guide rolls and a pair of separating rolls, a bunching die adapted to receive and bundle the strips in parallel relation, a driven wheel having a peripheral groove to receive the strips and form the same into a fillet while exerting tension thereon to draw the fabric past the rollers in order to tear the same, bead forming means comprising a wheel having a peripheral groove to receive the fillet, and a pressure wheel having a peripheral rib to force the fillet into the groove, the bead forming wheel having a peripheral speed greater than that of the fillet forming wheel, and a reel to wind up the resultant bead, the said reel being frictionally driven to provide slippage, substantially as described.

17. In a machine of the character described, the combination of a frame arranged to support a reel of rubber impregnated fabric, means to separate the sheet of fabric into strips, means to bunch the strips into a plurality of bundles, and means for forming each of the bundles into a bead comprising a plurality of peripherally grooved wheels each adapted to receive a bundle of strips and form the same into a bead under tension and compression, substantially as described.

18. In a machine of the character described, the combination of means to support a roll of rubber impregnated fabric, means to slit the forward end of the fabric into a plurality of strips, a pair of confining rolls adapted to receive therebetween the slitted end of the fabric, a pair of separating rolls adapted to separate alternate strips of the fabric, means to bunch the strips into a plurality of bundles, and means for forming each of the bundles into a bead comprising a plurality of peripherally grooved wheels each adapted to receive a bundle of strips and form the same into a bead under tension and compression, substantially as described.

19. In a machine of the character described, the combination of a frame adapted to support a roll of rubber impregnated fabric, means to slit the forward end of the fabric, a pair of confining rolls adapted to receive the slitted end of the fabric therebetween, a pair of separating rolls adapted to separate alternate strips of the fabric, a plurality of bunching dies each adapted to collect a plurality of the strips into a bundle in parallel relation, a driven shaft, a set of peripherally grooved wheels mounted on said shaft each in line with a bunching die, a second set of peripherally grooved wheels each arranged in the plane of a member of the first set, and a set of reels each including the plane of a pair of the grooved wheels, the first set of grooved wheels adapted to receive each a bundle of strips and form the same into a fillet, the second set of grooved wheels adapted to receive each a fillet and form the same into a bead, and the set of reels adapted to receive each a bead and wind the same up under tension, substantially as described.

20. In a machine of the character described, the combination of a frame adapted to support a roll of rubber impregnated fabric, means to slit the forward end of the fabric, a pair of confining rolls adapted to receive the slitted end of the fabric therebetween, a pair of separating rolls adapted to separate alternate strips of the fabric, a plurality of bunching dies each adapted to collect a plurality of the strips into a bundle in parallel relation, a driven shaft, a set of peripherally grooved wheels mounted on said shaft each in line with a bunching die, the connection between each of the grooved wheels and the shaft being by a ratchet and pawl to provide for angular adjustment of the wheel on the shaft, a second set of peripherally grooved wheels each arranged in the plane of a member of the first set, both sets of grooved wheels and the bunching dies being longitudinally displaceable to vary the distance therebetween, and a set of reels each including the plane of a pair of the grooved wheels, the first set of grooved wheels adapted to receive each a bundle of strips and form the same into a fillet, the second set of grooved wheels adapted to receive each a fillet and form the same into a bead, and the set of reels adapted to receive each a bead and wind the same up under tension, substantially as described.

WILLIAM C. STEVENS.

Witnesses:
 HOWARD J. ADAMS,
 A. G. PARTRIDGE.